United States Patent [19]

Wickham

[11] Patent Number: 4,890,514

[45] Date of Patent: Jan. 2, 1990

[54] ROTARY INDEXING MECHANISM

[75] Inventor: John L. Wickham, Glenarm, Md.

[73] Assignee: The J. L. Wickham Co., Inc., Baltimore, Md.

[21] Appl. No.: 170,088

[22] Filed: Mar. 9, 1988

Related U.S. Application Data

[63] Continuation of Ser. No. 879,623, Jun. 27, 1986, abandoned.

[51] Int. Cl.$^4$ ............................................. B23Q 16/00
[52] U.S. Cl. ........................................ 74/822; 74/815; 74/816
[58] Field of Search ................. 74/813 R, 813 L, 816, 74/817, 822, 819, 820, 815, 823, 10.2, 10.1, 10.39, 10.8, 130, 167, 125.5, 821, 826

[56] References Cited

U.S. PATENT DOCUMENTS

| | | | |
|---|---|---|---|
| 612,155 | 10/1898 | Blood | 74/816 |
| 750,278 | 1/1904 | Hanson | 74/817 X |
| 1,074,561 | 9/1913 | Potter et al. | 74/816 X |
| 1,148,640 | 8/1915 | Wehner | 74/817 |
| 1,968,990 | 8/1934 | Carlson | 74/130 |
| 2,192,251 | 3/1940 | Whittaker | 74/817 X |
| 2,665,589 | 1/1954 | Rusher | 74/823 X |
| 2,672,773 | 3/1954 | Schofield | 74/130 X |
| 2,848,909 | 8/1958 | Hill | 74/817 |
| 2,944,157 | 7/1960 | McAuslan et al. | |
| 3,040,592 | 6/1962 | Dillman et al. | 74/130 |
| 3,151,598 | 10/1964 | Bourns et al. | |
| 3,581,602 | 6/1971 | Bachmann | 74/822 |
| 3,733,929 | 5/1973 | Futula | 74/813 L X |
| 3,802,297 | 4/1974 | Schiler | 74/813 L |
| 4,056,722 | 11/1977 | Ray | |
| 4,559,682 | 12/1985 | Sachot | 74/813 L X |

FOREIGN PATENT DOCUMENTS

| | | | |
|---|---|---|---|
| 1502945 | 9/1969 | Fed. Rep. of Germany | 74/813 L |
| 2218755 | 10/1973 | Fed. Rep. of Germany | 74/817 |
| 2484887 | 12/1981 | France | 74/816 |
| 248450 | 12/1969 | U.S.S.R. | 74/813 |
| 11002 | of 1915 | United Kingdom | 74/167 |

Primary Examiner—Rodney M. Lindsey
Attorney, Agent, or Firm—Cushman, Darby & Cushman

[57] ABSTRACT

A rotary indexing mechanism for indexing a shaft or shaft mounted member in precise rotary increments and with precise end-of-movement positioning includes a reciprocable rack and pinion mechanism coupled to a rotatably mounted shaft. The pinion is coupled to the shaft through a one-way clutch so that movement of the rack in a first direction is coupled through the clutch to cause a corresponding rotation of the shaft with the clutch uncoupling the shaft during movement of the rack in the opposite direction. A first stop member(s) is carried by the shaft for movement along a path that orbits the shaft axis. A second stop member is carried by the rack along a linear path that intersects the orbit of the first stop member. As the rack rotates the shaft through a rotary increment, the rack-carried second member is positioned in the orbit of the first stop member with the two members engaging to halt further rotary movement. The rotary indexing mechanism allows successive rotary increments with precise end-of-movement positioning determined by the two interengaging members. In the preferred embodiment, one or both of the members is adjustable to provide various end-of-movement positions.

5 Claims, 3 Drawing Sheets

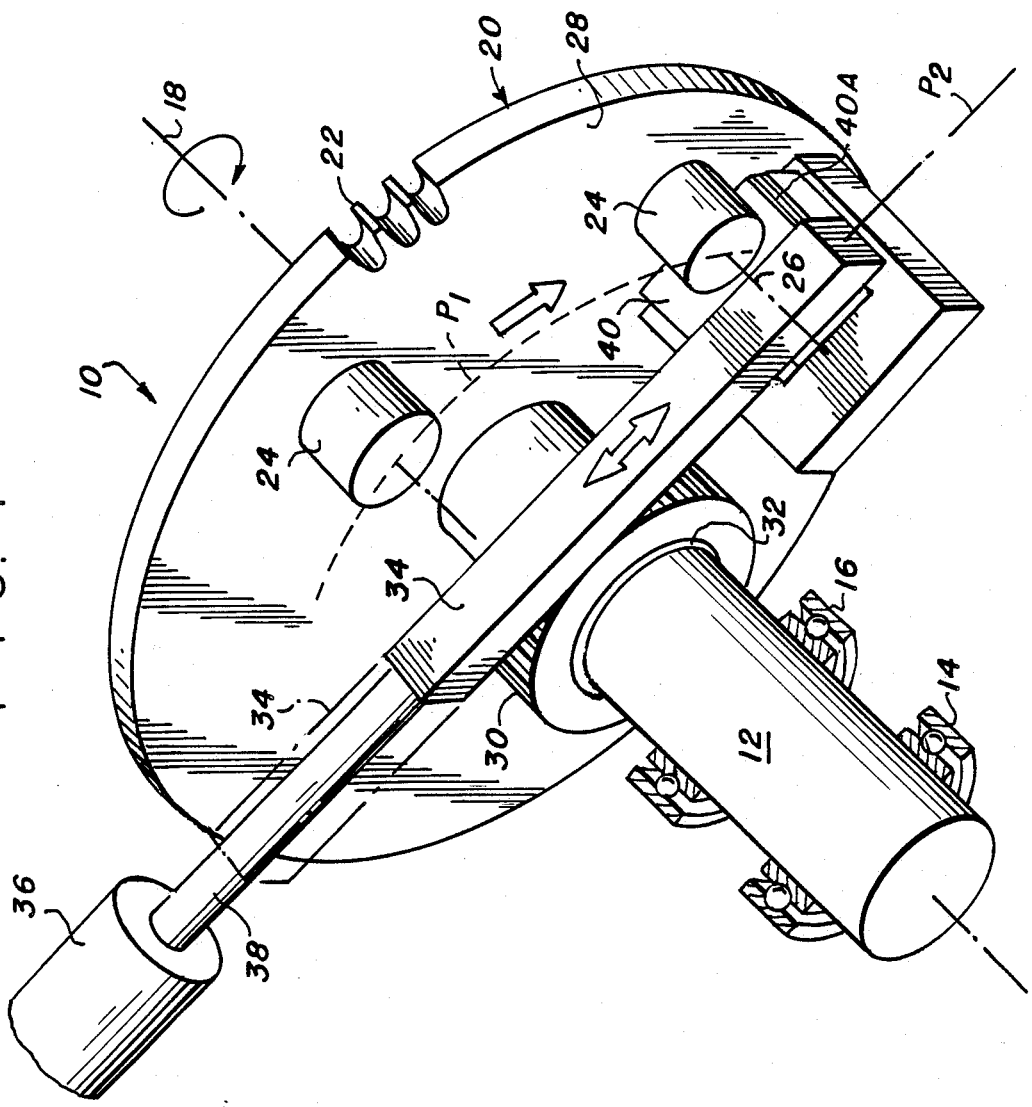
FIG. I
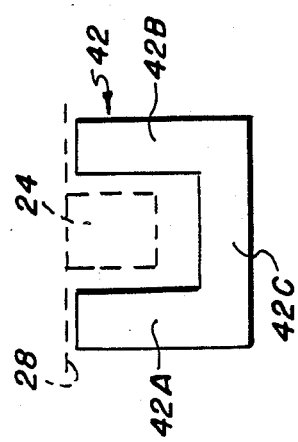
FIG. IB

4,890,514

ROTARY INDEXING MECHANISM

This is a continuation of application Ser. No. 879,623, filed June 27, 1986, which was abandoned upon the filing hereof.

BACKGROUND OF THE INVENTION

The present invention relates to rotary indexing mechanisms for rotating a shaft or shaft-connected member through a defined angular increment and, more particularly, to a rotary indexing mechanism that is less complicated than prior devices and which provides precise angular increments and end-of-movement positioning.

Various types of mechanical, electro-mechanical, and electronic rotary indexing mechanisms are known for providing incremental rotation of a shaft through a selected angular increment. Mechanical devices include pawl and rachet assemblies in which a first pawl rotates a rachet and a second pawl maintains the rotated rachet at its end-of-movement position and detent mechanisms in which a resiliently biased detent member engages the rotated member at selected detent positions. Electrical actuators, typically in the form of solenoids and other electro-magnetic devices, have been adapted to drive mechanical mechanisms to provide increased control. Lastly, electronic rotary indexing devices have used drive motors, usually of the stepper motor type, and shaft position sensors to provide a wide range of control including control of the size of the rotary increment and the precise end-of-movement location of the rotated member.

While prior rotary indexing mechanisms and devices have been satisfactory, many of the mechanical and electro-mechanical mechanisms do not provide for the precise end-of-movement positioning of the rotated member or an ability to adjust the end-of-movement position. Additionally, some prior devices apply a non-uniform force to the rotated member and cause undesirable variations in the motion of the rotated member as it is incremented. Electronically controlled indexing motors and their related control circuitry do provide precise incrementing and end-of-movement position control but are oftentimes too expensive for many applications.

SUMMARY OF THE INVENTION

In view of the above, it is an object of the present invention, among others, to provide a rotary indexing mechanism for rotating a shaft or shaft mounted member through an angular increment in which the mechanism is less complicated than prior mechanisms.

It is another object of the present invention to provide a rotary indexing mechanism for rotating a shaft or shaft mounted member through a precise angular increment in which the size of the increment is precisely determined.

It is another object of the present invention to provide a rotary indexing mechanism for rotating a shaft or shaft mounted member through an angular increment in which the end-of-movement position of the rotated member is precisely determined for each angular increment.

It is a further object of the present invention to provide a rotary indexing mechanism in which the rotated member is driven by a uniformly applied force no greater than that needed to effect operation of the mechanism.

In view of the above, the present invention provides a rotary indexing mechanism which includes a rotatably mounted shaft that carries at least one first stop member for movement along an orbital path about the rotated shaft. A drive mechanism includes a linear-to-rotary converting mechanism, such as an actuator driven rack and pinion assembly, with the rack reciprocated along a path that intersects the orbital path of the first stop member. An over-running or similar one-way clutch couples the pinion to the shaft so that motion of the rack in a first direction is coupled through the pinion and the one-way clutch to rotate the shaft while motion of the rack in the opposite direction is uncoupled from the shaft. The rack carries a second stop member that is positioned in the path of the first stop member to allow both stop members to engage one another and forcibly halt the rotation of the shaft at a precise end-of-movement position. One or both of the stop members is adjustably mounted to allow the user to precisely control the point of engagement between the two stop members to thus control the end-of-movement position of the shaft.

In the preferred embodiment, a shaft mounted for rotation about a longitudinal axis carries an enlarged diameter member such as a sprocket or gear. At least one stop post is secured to one face of the enlarged diameter member and progresses along an orbital path about the longitudinal axis of the shaft as the shaft is rotated. A pinion gear is connected to the shaft through a one-way clutch and is rotated in one direction or the other by a bidirectionally reciprocated rack. Rotation of the pinion gear in one direction is coupled through the one-way clutch to rotate the shaft and move the stop post along its orbital path. The rack carries a blocking plate that intersects or crosses the orbital path during the end portion of the rack's movement so that the blocking plate and the stop post engage one another to halt further rotary movement. The end-of-movement position of the rotary shaft can be precisely adjusted, for example, by eccentrically mounting the stop post on the enlarged diameter member, using posts of different diameters, or by mounting the post at varying radii to vary the intercept conditions between the stop post and the blocking plate.

The present invention advantageously provides a rotary indexing mechanism which is relatively simple in construction and inexpensive to fabricate and which allows precise angular incrementing of a rotary member and precise end-of-movement positioning.

A principal objective of the present invention is, therefore, the provision of an improved rotary indexing mechanism in which a shaft or shaft mounted member can be rotated through precise angular increments with the end-of-movement location adjustably and precisely determined. Other objects and further scope of applicability of the present invention will become apparent from the detailed description to follow, taken in conjunction with the accompanying drawings, in which like parts are designated by like reference characters.

BRIEF DESCRIPTION OF THE DRAWING

FIG. 1 is a perspective view of a rotary indexing mechanism in accordance with the present invention with selected parts omitted or shown in schematic form for reasons of clarity;

FIG. 1b is a elevational view of a support yoke illustrated in FIG. 1;

DESCRIPTION OF THE PREFERRED EMBODIMENT

Figure 1A:
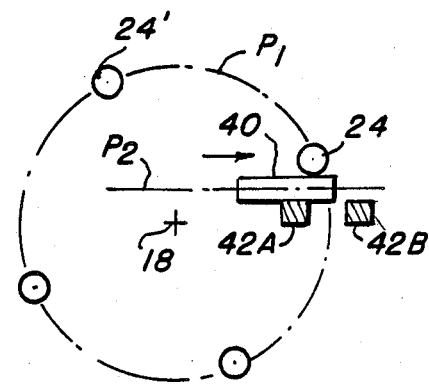
FIG. 1A is an end view, in partial cross section, of a rack and pinion gear set and a one-way clutch of FIG. 1.

A rotary indexing mechanism in accordance with the present invention is illustrated in FIG. 1 and designated generally therein by the reference character 10. As shown, a shaft 12 is mounted in bearings 14 and 16 for rotation about a longitudinally extending axis 18. An enlarged diameter member in the form of a chain engaging sprocket 20 having sprocket teeth 22 (of which three are illustrated) formed about its periphery is secured to the shaft 12 for rotation therewith. A plurality of cylindrical stop posts 24, each having respective axes 26, are secured to a face 28 of the sprocket 20 at a selected radius relative to axis 18 with the axes 26 aligned parallel to the shaft 12. Each of the stop posts 24 includes a reduced diameter threaded shaft (not shown in FIG. 1) that extends through a clearance bore in the sprocket 20 and which is secured in place by a threaded fastener. As the shaft 12 and sprocket 20 rotate about the axis 18 in the direction indicated, the stop posts 24 describe an orbital locus or path $P_1$ about the longitudinal axis 18. As explained more fully below, the stop posts 24 can be positioned at equal or unequal angular spacings about the path $P_1$, can be positioned at different radii relative to the longitudinal axis 18, and can be formed with different diameters or with other, non-cylindrical shapes.

The shaft 12 is driven, in the preferred embodiment, by a linear-to-rotary mechanism in the form of a rack and pinion set. As shown in FIGS. 1 and 1A, a pinion 30 is coupled to the shaft 12 through a concentrically mounted one-way clutch 32. The one-way clutch 32 is of the sprag-type in that rotation of the pinion 30 and an outer race 32A in a first direction (clockwise in the case of FIG. 1A) causes the sprags 32B to engage an inner race 32C to thus drive the shaft 12. Conversely, rotation of the outer race 32A in the opposite direction (counterclockwise in FIG. 1A) uncouples the inner race 32C and the shaft 12 from the outer race 32A to prevent counterclockwise rotation of the shaft 12. In addition to the sprag-type clutch illustrated, other types of one-way and overrunning clutches are suitable.

A toothed rack 34 engages the pinion 30 and is mounted for reciprocation along a linearly extending path $P_2$ between an advanced position, indicated generally in solid line illustration in FIG. 1, and a retracted position, as indicated partly in broken line illustration. The rack 34 is connected to and controlled by a bidirectional actuator 36, preferably in the form of a hydraulic or pneumatic cylinder (partially illustrated), having a connecting rod 38 connected to the rack 34. A stop plate 40 is connected to one end of the rack 34 and moves generally along the path $P_2$ between the solid position of FIG. 1 and a retracted position. As shown in solid line illustration, the stop plate 40 intersects the path $P_1$ described by the stop posts 24. If desired, the stop plate 40 can be provided with a beveled surface 40A at its leading edge.

A support yoke 42 (FIG. 1B) is mounted to support the stop plate 40 as it is engaged by the stop post posts 24, as explained below, and includes spaced apart legs 42A and 42B connected by a bridge 42C to define an aperture or window 44 sufficiently large to allow the stop posts to pass through as they move along the path $P_2$.

Figure 2A:
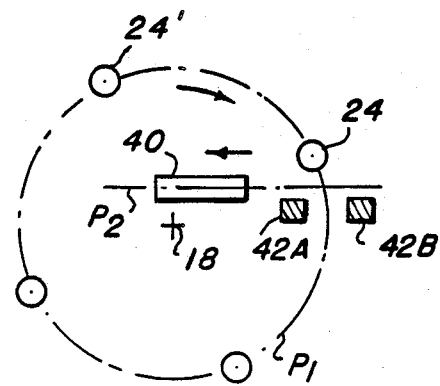
FIG. 2A is a schematic view of various components illustrated in FIG. 1 in a first position.
Figures 2B, 2C:
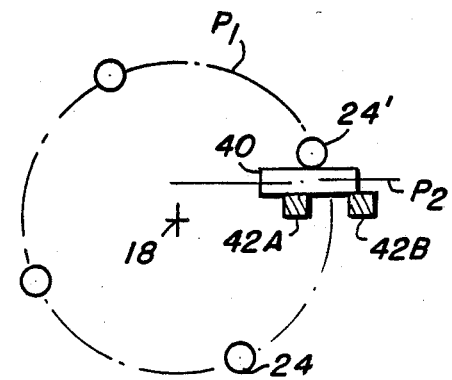
FIG. 2B is a schematic view, similar to FIG. 2A, illustrating the components in second position.
FIG. 2C is a schematic view, similar to FIGS. 2A and 2B, illustrating the components in a third position.

The operation of the rotary indexing mechanism 10 is illustrated in schematic form in FIGS. 2A, 2B, and 2C. As shown in FIG. 2A, the stop plate 40 is at an advanced position along the path $P_2$ with the stop plate 40 blocking the engaged stop post 24 from movement along the path $P_1$ and thus establishing the end-of-movement position of the shaft 12. In this position, as illustrated in FIG. 1, the stop plate 40 is constrained between the engaged stop post 24 and the support yoke 42. In order to effect a rotary incrementing of the shaft 12, the rack 34, under the control of the actuator 36, is retracted along path $P_2$ to move the stop plate 40 to its retracted position, as represented in FIG. 2B. During retraction of the rack 34 and the stop plate 40, the shaft 12 is uncoupled from the pinion 30 by the one-way clutch 32 as described above. Thereafter, the motion of the actuator 36 is reversed and the rack 34 and the stop plate 40 are moved along the path $P_2$ to their respective advanced positions. As discussed above in relationship to FIG. 1A, the rotation of the pinion 30 is coupled through the one-way clutch 32 to the shaft 12 to cause the shaft 12 and the connected sprocket 20 to rotate in the clockwise direction. The stop post 24 that was in engagement with the stop plate 40 proceeds along the path $P_1$, passing through the window 44 defined by the support yoke 42. As the rack 34 and the connected stop plate 40 are advanced to the right, the stop plate 40 intersects and moves into the path $P_1$ of the next successive stop post 24'. At some point in the movement of the stop post 24' and the stop plate 40, the two components engage one another to halt further motion and thus establish the end-of-movement position of the shaft 12 and the sprocket 20. As can be appreciated, the operational sequence can be repeated in a successive manner to provide continuous rotary incrementing of the shaft 12 and sprocket 20 through predetermined angular increments.

Since the rotary motion of the shaft 12 and sprocket 20 is halted by engagement of the stop posts 24 and the stop plate 40, the end-of-movement position of the shaft 12 is determined by the stop posts 24 and the stop plate 40 and is independent of any clearances or changes in clearances between the engaged rack 34 and pinion 30 or any 'play' in the one-way clutch 32 as it changes from its uncoupled condition to its coupled condition as the rack 34 is advanced along its path $P_2$. Thus the actuator 36 will continue to drive the rack 34 until the stop post 24 engages the stop plate 40 to halt further motion and will continue to accurately position the shaft 12 and sprocket 20 regardless of wear present in the one-way clutch 32 or the rack 34 and pinion 30 set.

The magnitude of the rotary increment is controlled by controlling the angular spacing of the various stop posts 24 along the path P₁. The stop posts 24 can be mounted with an equi-angular spacing to provide equal rotary increments or with unequal spacing to provide unequal rotary increments. In addition, the stroke length of the rack 34 relative to the angular increment desired can be such that more than one stroke of the rack 34 can be used to effect the desired rotary incrementing of the shaft 12.

Figure 3:
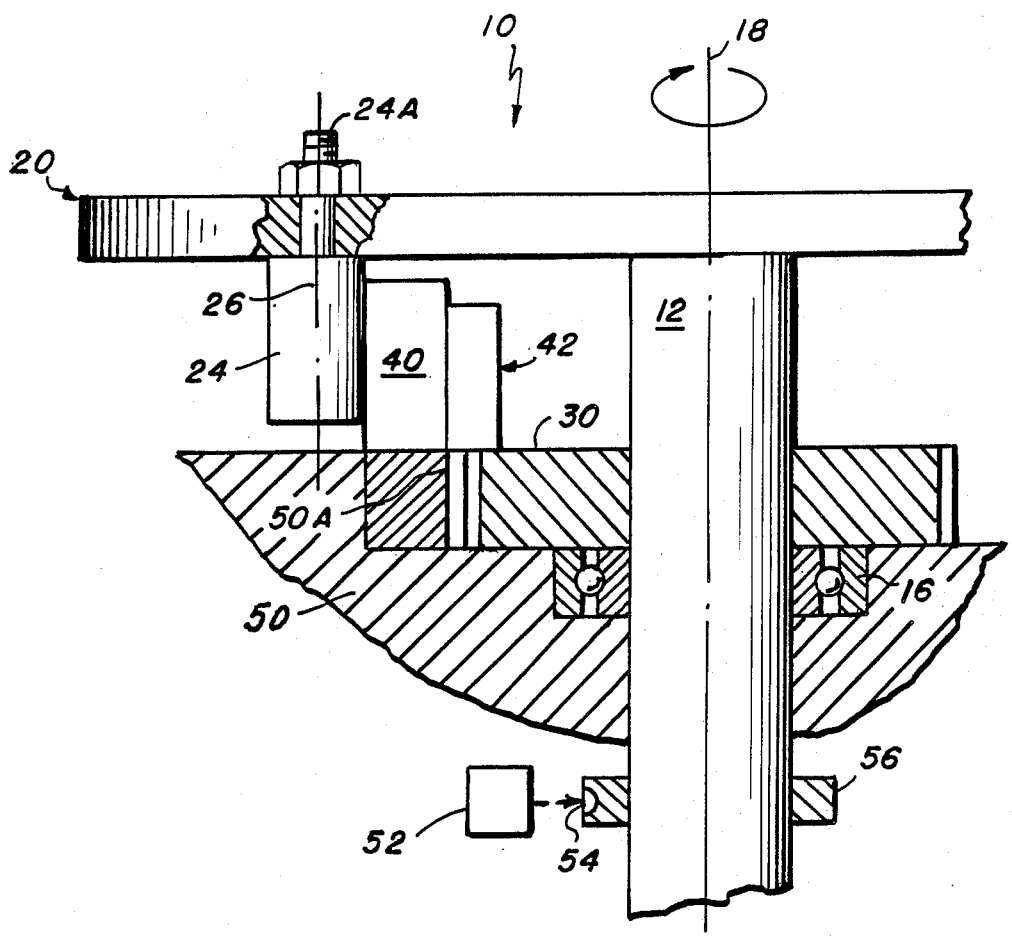
FIG. 3 is a side view, in partial cross section, of another embodiment of the present invention, illustrating the manner in which the principal components of the rotary indexing mechanism are mounted on a support plate.
Figure 3A:
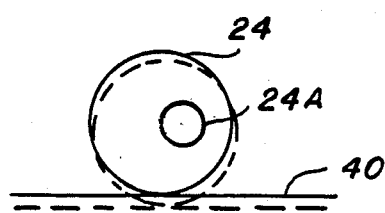
FIG. 3A is a schematic representation of an eccentrically mounted stop post illustrated in FIGS. 1 and 3.

The end-of-movement position for each rotary increment is determined by the dimensional relationship of the stop posts 24 and the stop plate 40. The end-of-movement position can be varied, for example, by providing stop posts 24 with different diameters, cross-sectional areas, or, as shown in the embodiment of FIG. 3, providing each stop post 24 with a reduced diameter threaded stud 24A that is positioned eccentrically relative to the axis 26 of the stop post 24. Thus, as shown in FIG. 3A, the dimensional relationship of the stop posts 24 relative to the stop plate 40 can be readily adjusted to adjust, with precision, the end-of-movement position of the shaft 12 and sprocket 20. As shown in FIG. 3, the shaft 12 is carried in a support plate 50 that also carries the bearings 14 and 16 with the rack 34 located between the pinion 30 and a shoulder 50A. In the embodiment of FIG. 3, the shaft 12 is incrementally rotatable in the opposite direction of that illustrated in FIG. 1.

During the operating stroke, the actuator 36 is preferably driven for a fixed time period of sufficient duration to insure that the rack 34 is driven to its advanced position. If desired, various switches, such as switch 52 (FIG. 3) co-acting with one or more detents 54 on a shaft-mounted collar 56 can be used to determine when the rack 34 is in its retracted or advanced positions. The dotted arrow in FIG. 3 schematically illustrates the operative coupling between switch 52 and actuator 54. The actuator 36 is preferably of the hydraulic or pneumatic type, since the operating pressure and force applied can be readily controlled by controlling the fluid pressure supplied to the actuator 36. Since the actuator 36 is periodically stalled by the operation of the engaged stop posts 24 and stop plate 40, the actuator 36 operating force is desirably limited e.g., by limiting the actuation fluid pressure to some upper limit necessary to effect operation. In a typical operating cycle, the actuator 36 is pressurized with an operating fluid to drive the rack 34 to the right in FIG. 1. The actuator 36 is pressurized for a predetermined time period, for example, 0.5 seconds, this time period having been empirically determined to be longer than the actual time required to effect the desired rotary increment. When the switch 52 is actuated by the detent 54, the output of the switch 52 functions to certify that the operating stroke has indeed proceeded to completion. If, for some reason, the rotary incrementing is not completed, the machine will be stopped at the end of the predetermined time period.

In the preferred embodiment, a rack and pinion gear set has been presented as the rotary driving mechanism. As can be appreciated, other devices that produce the periodic rotation of the shaft and the placement of the stop plate are likewise suitable.

Thus it will be appreciated from the above that as a result of the present invention, a highly effective rotary indexing mechanism is provided by which the principal objective, among others, is completely fulfilled. It will be equally apparent and is contemplated that modification and/or changes may be made in the illustrated embodiment without departure from the invention. Accordingly, it is expressly intended that the foregoing description and accompanying drawings are illustrative of preferred embodiments only, not limiting, and that the true spirit and scope of the present invention will be determined by reference to the appended claims.

What is claimed is:

1. A rotary indexing mechanism comprising:
   a rotatably mounted shaft carrying at least two first stop members that revolve about the shaft along an orbital path in response to rotation of said shaft;
   a one-way clutch coupled to said shaft, said clutch drivable in a first direction to couple rotation to said shaft and in the opposite direction in which said shaft is uncoupled;
   linearly reciprocating means coupled to said clutch for driving said clutch in the first and opposite directions to cause incremental rotation of said shaft when driven in the first direction, said linearly reciprocating means reciprocable along a second path that periodically intersects said orbital path of said first stop members; and
   a second stop member integrally connected to said reciprocating means and reciprocable along said second path in response to driving of said clutch in the first and opposite directions, said second stop member intersecting said orbital path between two of said first stop members when said clutch is driven in the first direction;
   one of said first stop members and the second stop member mechanically engaging one another as said clutch is driven in the first direction to stop rotation of said shaft at a predetermined rotary position.

2. A rotary indexer comprising:
   a rotatably mounted shaft carrying an enlarged diameter disc member thereon, said disc member having a plurality of first stop members affixed thereto that revolve about the shaft along a circumferential path in response to rotation of said shaft;
   a one-way clutch coupled to said shaft, said clutch drivable in a first direction to couple rotation to said shaft and in the opposite direction in which said shaft is uncoupled;
   rack-and-pinion means coupled to said clutch for driving said clutch in the first and opposite directions to cause incremental rotation of said shaft when said clutch is driven in the first direction, said rack-and-pinion means including a pinion gear connected to said clutch and a rack member in engagement with said pinion gear, said rack member reciprocable along a linear path that intercepts said circumferential path of said first stop members;
   drive means coupled to said rack member for driving said rack member in the first and opposite directions to cause incremental rotation of said shaft when said rack member is driven in the first direction; and
   a second stop member integrally connected to said rack member and reciprocable along said linear path in response to driving of said rack member in the first and opposite directions, said second stop member extending between two of said first stop members when said clutch is driven in the first direction to mechanically engage a one of said first stop members as said clutch is driven in the first direction to thereby stop rotation of said shaft at a predetermined position determined by engagement between said first and second stop members.

3. A rotary indexing mechanism as in claim 2, wherein at least one of said first stop members is movably affixed to said disc member.

4. A rotary indexing mechanism as in claim 3, wherein at least one said first stop members comprises a cylindrical post.

5. A rotary indexing mechanism as in claim 2, wherein said second stop member is affixed to an end of said rack member.

* * * * *